United States Patent
Zhang et al.

(10) Patent No.: US 10,440,162 B2
(45) Date of Patent: Oct. 8, 2019

(54) MOBILE TERMINAL, HOUSING COMPONENT, AND MANUFACTURING METHOD THEREOF

(71) Applicant: Guangdong Oppo Mobile Telecommunications Corp., Ltd., Dongguan (CN)

(72) Inventors: Tao Zhang, Dongguan (CN); Wenfeng Sun, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/684,961

(22) Filed: Aug. 24, 2017

(65) Prior Publication Data

US 2018/0063304 A1 Mar. 1, 2018

(30) Foreign Application Priority Data

Aug. 25, 2016 (CN) .......................... 2016 1 0727662
Aug. 25, 2016 (CN) ..................... 2016 2 0945031 U

(51) Int. Cl.
*H04M 1/00* (2006.01)
*H04M 1/02* (2006.01)
(Continued)

(52) U.S. Cl.
CPC .......... *H04M 1/0249* (2013.01); *B29C 65/02* (2013.01); *H04M 1/0202* (2013.01);
(Continued)

(58) Field of Classification Search
CPC .... H01Q 1/243; H04M 1/0202; H04M 1/026; H04M 1/0249; B29C 45/14
(Continued)

(56) References Cited

U.S. PATENT DOCUMENTS 2,983,815 A * 5/1961 Guyton .................... H03G 3/30
                                                        330/129
9,722,301 B2 * 8/2017 Kim ..................... H05K 5/0217
(Continued)

FOREIGN PATENT DOCUMENTS

| CN | 201845889 | 5/2011 |
|---|---|---|
| CN | 204067562 | 12/2014 |

(Continued)

*Primary Examiner* — Edward F Urban
*Assistant Examiner* — Max Mathew
(74) *Attorney, Agent, or Firm* — Young Basile Hanlon & MacFarlane, P.C.

(57) ABSTRACT

A mobile terminal, a housing component and a manufacturing method thereof are provided. The housing component of the mobile terminal includes a conductive housing and at least one conductive component. The conductive housing is provided with at least one slot. The at least one slot is configured to divide the conductive housing into a plurality of regions, and is filled with an insulating layer. The at least one conductive component is attached to the conductive housing and across the at least one slot, so as to electrically connect the plurality of regions together. The housing component of the mobile terminal realizes grounding and conduction of an antenna through electrically connecting the plurality of regions of the conductive housing using the at least one conductive component.

20 Claims, 4 Drawing Sheets

(51) Int. Cl.
*B29C 65/02* (2006.01)
*B29L 31/34* (2006.01)
*H01Q 1/24* (2006.01)

(52) U.S. Cl.
CPC ..... *H04M 1/026* (2013.01); *B29K 2995/0005* (2013.01); *B29L 2031/3481* (2013.01); *H01Q 1/243* (2013.01)

(58) Field of Classification Search
USPC ...................................................... 455/575.1
See application file for complete search history.

(56) References Cited

U.S. PATENT DOCUMENTS

| | | | |
|---|---|---|---|
| 2007/0049068 A1 | 3/2007 | Yanagida | |
| 2009/0153407 A1* | 6/2009 | Zhang | H01Q 1/243 343/702 |
| 2010/0022197 A1* | 1/2010 | Kato | H04B 1/005 455/75 |
| 2010/0028709 A1 | 2/2010 | Li et al. | |
| 2012/0133560 A1 | 5/2012 | Tang | |
| 2015/0313045 A1 | 10/2015 | Jin et al. | |
| 2016/0056527 A1* | 2/2016 | Pascolini | G06K 9/00006 343/702 |
| 2016/0190691 A1* | 6/2016 | Piskun | H01Q 5/30 343/729 |
| 2017/0117613 A1* | 4/2017 | Wei | H01Q 21/30 |
| 2017/0223852 A1 | 8/2017 | Gu et al. | |
| 2017/0338548 A1* | 11/2017 | Xiong | H04M 1/0277 |
| 2018/0063303 A1 | 3/2018 | Zhang et al. | |
| 2018/0124221 A1* | 5/2018 | Li | B32B 7/12 |

FOREIGN PATENT DOCUMENTS

| | | |
|---|---|---|
| CN | 104823532 | 8/2015 |
| CN | 205069979 | 3/2016 |
| CN | 105896085 | 8/2016 |
| CN | 205583131 | 9/2016 |
| CN | 106210200 | 12/2016 |
| CN | 106332479 | 1/2017 |
| CN | 205985326 | 2/2017 |
| CN | 205992935 | 3/2017 |
| CN | 106602222 | 4/2017 |
| CN | 206364852 | 7/2017 |
| EP | 3038331 | 6/2016 |
| WO | WO 2013/165441 | 11/2013 |

\* cited by examiner

MOBILE TERMINAL, HOUSING COMPONENT, AND MANUFACTURING METHOD THEREOF

RELATED APPLICATIONS

This application claims the benefit of priority of Chinese Patent Applications Nos. 201620945031.9 and 201610727662.8, both filed on Aug. 25, 2016. The contents of the above applications are all incorporated by reference as if fully set forth herein in their entirety.

FIELD AND BACKGROUND OF THE INVENTION

The present disclosure relates to a technical field of electronic apparatuses, and more specifically, the present disclosure relates to a mobile terminal, a housing component, and a manufacturing method thereof.

The frame of a cell phone is generally made of aluminum alloy. In order to ensure the performance of antennas, a metal back cover can be cut off during machining. It is impossible for metal blocks being cut off to achieve electrical connection, thereby affecting grounding and conduction of the antennas. In the related art, a plurality of metal blocks can be connected by reserving some metal during the machining to realize conductive connection. However, the metal connection of some other parts needs to be cut off during machining, which makes the procedure complicated.

DESCRIPTION OF SPECIFIC EMBODIMENTS OF THE INVENTION

Embodiments of the present disclosure are described in detail below and examples of the embodiments are illustrated in the accompanying drawings. The description of the embodiments with reference to the accompanying drawings below is exemplary, aims at illustrating the present disclosure, and cannot be considered as limitations to the present disclosure.

In the description of the present disclosure, it is to be appreciated that orientation or location relationships indicated by terms such as "length", "width", "thickness", "upper", "lower", "front", "back", "left", "right", "up", "down", "vertical" and "horizontal" are based on orientation or location relationships illustrated in the accompanying drawings. The terms are only used to facilitate the description of the present disclosure and to simplify the description, not used to indicate or imply the relevant device or element must have a particular orientation or must be structured and operate under the particular orientation and therefore cannot be considered as limitations to the present disclosure.

In addition, the terms "first" and "second" are only used for description purpose, and cannot be considered as indicating or implying relative importance or implicitly pointing out the number of relevant technical features. Thus, features being correspondingly defined as "first" and "second" may each expressly or implicitly include at least one of the features. In the description of the present disclosure, the meaning of "a plurality of" is at least two, such as two and three, unless otherwise definitely and specifically defined.

In the present disclosure, unless otherwise definitely specified and defined, the terms "install", "connected", "connection", "fixed" and so on should be considered broadly, for example, as a fixed connection, a detachable connection, an integral connection, a mechanical connection, an electrical connection, or a connection for communicating with each other; as being directly connected, or being indirectly connected through an intervening medium; as an internal connection between two elements, or as an operational relationship between two elements. To those of ordinary skill in the art, the specific meanings of the aforementioned terms in the present disclosure may be appreciated based on corresponding specific situations.

Figure 1:
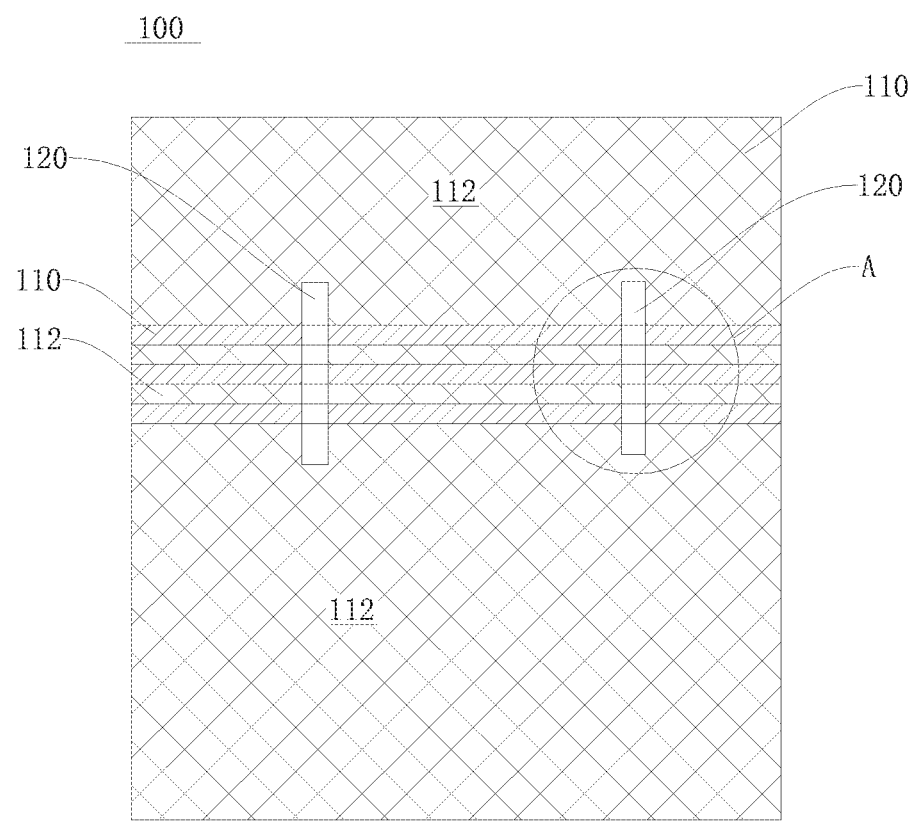
FIG. 1 is a schematic rear view of the structure of a housing component of a mobile terminal in accordance with an embodiment of the present disclosure.
Figure 2:
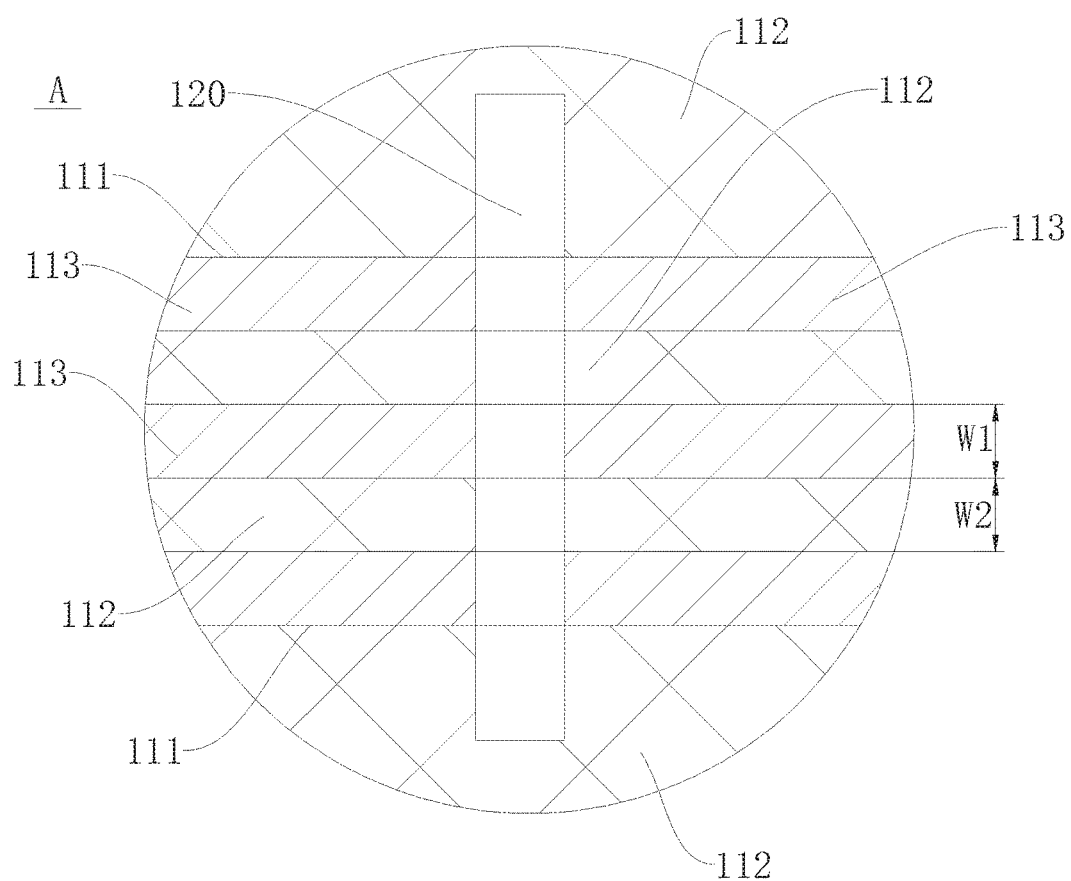
FIG. 2 is a schematic partial enlarged diagram of a portion A in FIG. 1.
Figure 3:
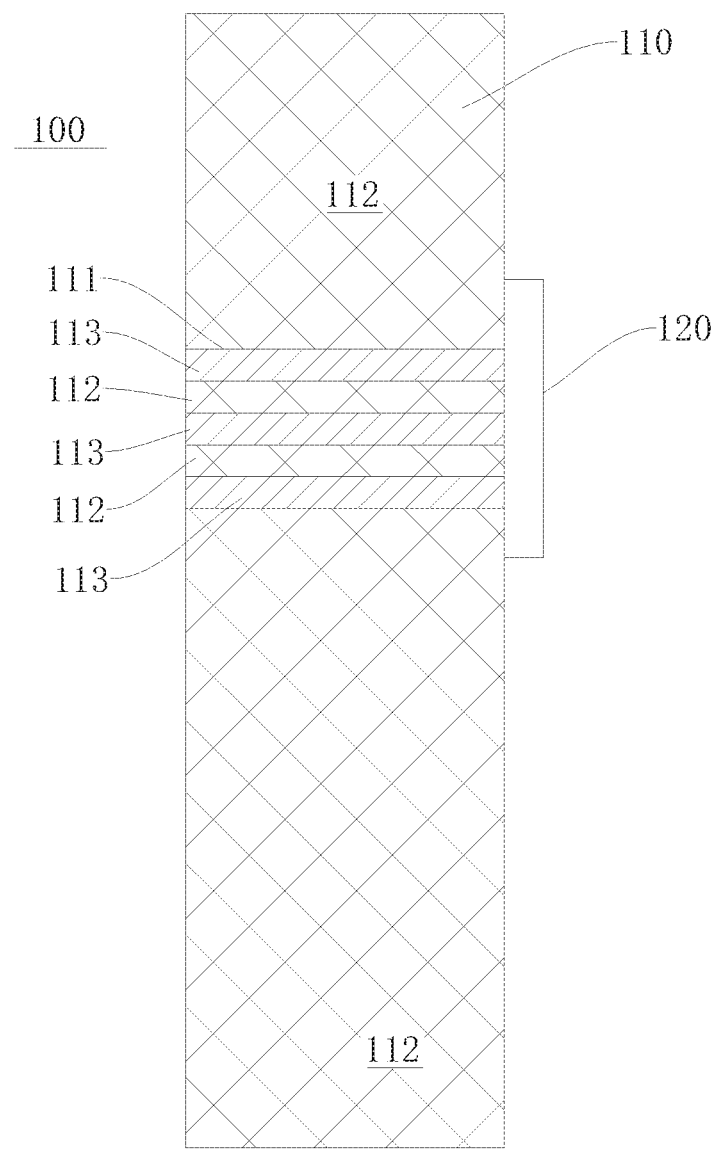
FIG. 3 is a schematic side view of the structure of a housing component of a mobile terminal in accordance with an embodiment of the present disclosure.

With reference to FIG. 1 to FIG. 3, a housing component 100 of a mobile terminal 200 (FIG. 4), in accordance with an embodiment of the present disclosure, is described in detail below. It is to be noted that the mobile terminal 200 may be a cell phone, a tablet computer, a laptop computer, and the like. The housing component 100 can also be applied to other terminals according to actual needs. The housing component 100 may be applied to the mobile terminal 200 to protect internal components of the mobile terminal 200.

As illustrated in FIGS. 1 to 3, the housing component 100 of the mobile terminal 200, in accordance with an embodiment of the present disclosure, includes a conductive housing 110 and at least one conductive component 120. The conductive housing 110 has at least one slot 111 provided thereon. In FIG. 2, three slots 111 are illustrated. However, the present disclosure is not limited thereto. The number of the at least one slot 111 can be adjusted according to actual needs. For example, one slot, or two slots can be provided in different scenes. In accordance with an embodiment of the present disclosure, the at least one slot 111 can divide the conductive housing 110 into a plurality of regions 112. As illustrated in FIG. 2, four regions 112 can be formed when the three slots 111 are provided. Further, the number of the at least one slot 111 is greater than or equal to two, and the slots 111 are parallel to each other to define the plurality of regions 112. In accordance with an embodiment of the present disclosure, the at least one slot 111 can be filled with an insulating layer 113. In accordance with an embodiment of the present disclosure, the at least one conductive component 120 is attached to the conductive housing 110 and across the at least one slot 111, so as to electrically connect the plurality of regions 112 together. In accordance with another embodiment of the present disclosure, the at least one conductive component 120 intersects with the at least one slot 111, so as to electrically connect the plurality of regions 112 together. With regard to the number of the at least one conductive component 120, the present disclosure is not particularly limited. For example, as illustrated in FIG. 1, two conductive components 120 are provided.

In accordance with an embodiment of the present disclosure, the at least one slot 111 of the conductive housing 110 may extend along a horizontal direction of the conductive housing 110 which is a left-right direction as illustrated in FIG. 1. The at least one slot 111 can divide the conductive housing 110 into the plurality of regions 112. The plurality of regions 112 are distributed at intervals along a vertical direction of the conductive housing 110 which is an up-down direction as illustrated in FIG. 1. In accordance with an embodiment of the present disclosure, the at least one conductive component 120 may extend along the vertical direction of the conductive housing 110 across the at least one slot 111, so as to electrically connect the plurality of regions 112 together. In accordance with another embodiment of the present disclosure, the at least one conductive component 120 may extend along the vertical direction of the conductive housing 110 and intersect with the at least one slot 111 vertically, so as to electrically connect the plurality of regions 112 together. In both embodiments, the at least one conductive component 120 is perpendicular to the at least one slot 111.

It is to be noted that when the mobile terminal 200 has a communication function or a signal transmitting function, the conductive housing 110 may be used as a part of an antenna of the mobile terminal 200. The insulating layer 113 between adjacent two regions of the plurality of regions 112 may be used as a medium for transmitting signals, thereby strengthening signal strength and stability of the mobile terminal 200. In the related art, in order for a plurality of regions to be electrically connected together, for example, computer numerical control (CNC) machining is adopted. During the machining, some material is reserved to realize electrical connection between the plurality of regions. Such machining method has a long process cycle and is complicated in procedures, and deformation may occur to slots during plastic injection molding because of the reservation of the material during the machining process.

The housing component 100 of the mobile terminal 200 in accordance with the embodiment of the present disclosure can realize grounding and conduction of an antenna by electrically connecting the plurality of regions 112 of the conductive housing 110 through the at least one conductive component 120. Meanwhile, the CNC machining cycle may be also shortened and deformation of plastic injection molding resulting from material reservation may be reduced.

In accordance with an embodiment of the present disclosure, each of the at least one conductive component 120 is welded to each of the plurality of regions 112. The welding procedure is simple and easy to operate, thereby further shortening the process cycle of the conductive housing 110. However, the present disclosure is not limited thereto. For example, each of the at least one conductive component 120 may be attached to each of the plurality of regions 112 through a conductive adhesive. When the at least one conductive component 120 is made of aluminum alloy, the conductive adhesive may contain distributed particles that include a composition selected from the group consisting of aluminum-silicon compositions.

As illustrated in FIG. 1, in accordance with an embodiment of the present disclosure, the number of the at least one conductive component 120 is greater than or equal to two, and the conductive components 120 are distributed at intervals along a length direction of the at least one slot 111. Thus, connection stability between the plurality of regions 112 may be strengthened. For example, as illustrated in FIG. 1, each of the conductive components 120 may have an elongated-slot shape and extends along the vertical direction of the conductive housing 110. The at least one slot 111 can extend along the horizontal direction of the conductive housing 110. The conductive components 120 are distributed at intervals along the horizontal direction of the conductive housing 110. Further, the number of the at least one conductive component 120 and intervals at which the at least one conductive component 120 is distributed can be determined based on one or more desired operating frequencies of the mobile terminal 200. For example, as illustrated in FIG. 1, there are two conductive components 120 distributed at intervals along the length direction of the at least one slot 111. A first interval between a left vertical edge of the at least one slot 111 and a left conductive component 120, a second interval between the left conductive component 120 and a right conductive component 120, and a third interval between the right conductive component 120 and a right vertical edge of the at least one slot 111 can be determined based on the desired operating frequencies of the antennas corresponding to the first, second and third intervals. When there is only one desired operating frequency of the antennas, the first, second and third intervals can be the same and when there are multiple desired operating frequencies of the antennas, some or all of the first, second and third intervals can be different.

In accordance with an embodiment of the present disclosure, as illustrated in FIG. 2, a width of each of the at least one slot 111 is W1. That is, a width of each of the at least one slot 111 along the vertical direction of the conductive housing 110 is W1. W1 may satisfy 0.3 mm≤W1≤0.5 mm. After being experimentally verified, when the width of each of the at least one slot 111 is 0.3 mm≤W1≤0.5 mm, signal strength and stability of the mobile terminal 200 can be strengthened. In accordance with an embodiment of the present disclosure, as illustrated in FIG. 1 to FIG. 3, the number of the at least one slot 111 is greater than or equal to two, and the slots 111 are spaced apart from each other. As illustrated in FIG. 2, the spacing between adjacent two slots 111 is W2. That is, the distance between adjacent two slots 111 along the vertical direction of the conductive housing 110 is W2. W2 may satisfy 0.3 mm≤W2≤1 mm. In accordance with another embodiment of the present disclosure, the number of the at least one slot 111 is greater than or equal to two, and the slots 111 are arranged at intervals in the vertical direction of the conductive housing 110. The interval between any adjacent two slots 111 is W2. W2 may satisfy 0.3 mm≤W2≤1 mm. In accordance with an embodiment of the present disclosure, the number of the at least one slot 111 is N, where N may satisfy 1≤N≤3.

In accordance with an embodiment of the present disclosure, the at least one conductive component 120 may have a material of aluminum alloy. The insulating layer 113 may have a material selected from a group consisting of rubber, plastic, resin, glass, ceramic, paint, and mica. Further, to facilitate the welding of the at least one conductive component 120 to the conductive housing 110, the material of the conductive housing 110 may be the same as that of the at least one conductive component 120. For example, the at least one conductive component 120 may be made of aluminum alloy and the conductive housing 110 may be made of aluminum alloy.

Figure 4:
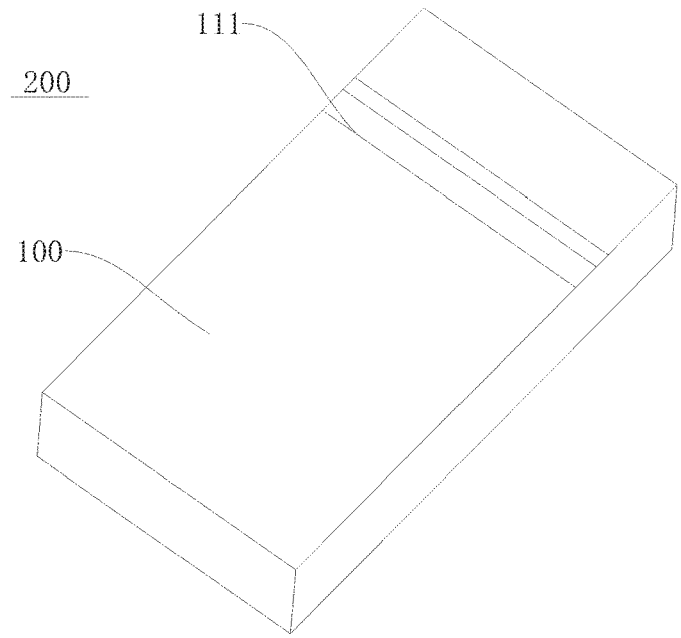
FIG. 4 is a schematic structural diagram of a mobile terminal in accordance with an embodiment of the present disclosure.

As illustrated in FIG. 4, a mobile terminal 200, in accordance with an embodiment of the present disclosure, includes any of the aforementioned housing components 100 of the mobile terminal 200.

The mobile terminal 200 in accordance with the embodiment of the present disclosure can realize grounding and conduction of an antenna by electrically connecting the plurality of regions 112 of the conductive housing 110 with aid of the at least one conductive component 120. Meanwhile, the CNC machining cycle may be also shortened and deformation of plastic injection molding resulting from material reservation may be reduced.

Figure 5:
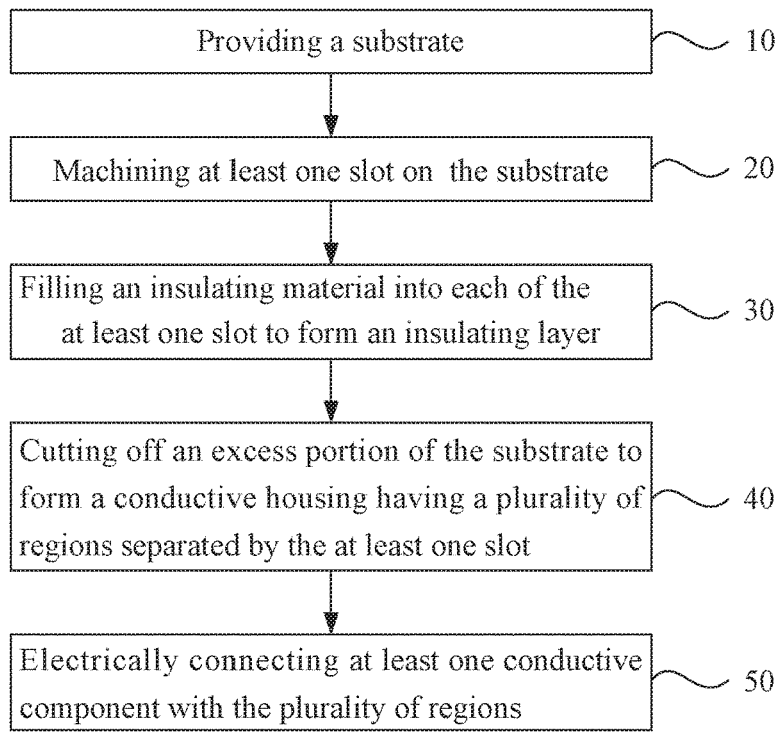
FIG. 5 is a flowchart of a manufacturing method of a housing component of a mobile terminal in accordance with an embodiment of the present disclosure.

As illustrated in FIG. 5, a manufacturing method of a housing component 100 of a mobile terminal 200, in accordance with an embodiment of the present disclosure, is provided. The housing component 100 can be any of the aforementioned housing components 100 of the mobile terminal 200. The manufacturing method can include the following operations.

At block 10, a substrate is provided.

At block 20, at least one slot 111 on the substrate is machined. The at least one slot 111 is arranged at intervals in a vertical direction of the substrate. The vertical direction of the substrate is the same as the aforementioned vertical direction of the conductive housing 110. The at least one slot 111 is formed by machining in a cutting manner on the substrate.

At block 30, an insulating material is filled into each of the at least one slot 111 to form an insulating layer 113. Each of the at least one slot 111 may be completely filled by the insulating material. The insulating material may be selected from a group consisting of rubber, plastic, resin, glass, ceramic, paint, and mica.

At block 40, an excess portion of the substrate is cut off to form a conductive housing 110 having a plurality of regions 112 separated by the at least one slot 111.

At block 50, at least one conductive component 120 is electrically connected with the plurality of regions 112.

The manufacturing method of the housing component 100 of the mobile terminal 200 in accordance with the embodiment of the present disclosure can realize grounding and conduction of an antenna by electrically connecting the plurality of regions 112 of the conductive housing 110 through the at least one conductive component 120. Meanwhile, the CNC machining cycle may be also shortened and deformation of plastic injection molding resulting from material reservation may be reduced.

In the description of the present disclosure, terms such as "an embodiment", "some embodiments", "an example", "a specific example", and "some examples" referred to in the description mean at least one embodiment or example of the present disclosure includes a specific feature, structure, material or characteristic described in combination with an embodiment or example. In the present disclosure, an illustrative expression of the aforementioned terms does not need to be focused on the same embodiment or example. Further, the specific feature, structure, material or characteristic described may be adequately combined in any of or a plurality of embodiments and examples. In addition, in a situation where conflicts between each other do not exist, persons skilled in the art may combine and group different embodiments and examples with features of different embodiments and examples described in the present disclosure.

Although the embodiments of the present disclosure have been illustrated and described above, it is to be appreciated that the foregoing embodiments are illustrative and cannot be considered as limitations to the present disclosure. Persons skilled in the art may change, modify, replace and vary the foregoing embodiments within the scope of the present disclosure.

What is claimed is:

1. A housing component of a mobile terminal, comprising:
a conductive housing provided with at least one slot, the at least one slot being configured to divide the conductive housing into a plurality of regions and filled with an insulating layer; and
at least one conductive component being across the at least one slot, so as to electrically connect all regions together, wherein each of the at least one conductive component is attached to each of the all regions,
wherein, a number of the at least one conductive component and intervals at which the at least one conductive component is distributed are determined based on one or more desired operating frequencies of at least one antenna of the mobile terminal.

2. The housing component of the mobile terminal of claim 1, wherein each of the at least one conductive component is welded to each of the plurality of regions.

3. The housing component of the mobile terminal of claim 1, wherein the at least one conductive component is arranged at intervals along a length direction of the at least one slot.

4. The housing component of the mobile terminal of claim 1, wherein the at least one conductive component has a material of aluminum alloy, and the insulating layer has a material selected from a group consisting of rubber, plastic, resin, glass, ceramic, paint, and mica.

5. The housing component of the mobile terminal of claim 1, wherein a width of each of the at least one slot is W1 and $0.3 \text{ mm} \leq W1 \leq 0.5 \text{ mm}$.

6. The housing component of the mobile terminal of claim 1, wherein the number of the at least one slot is N and $1 \leq N \leq 3$.

7. The housing component of the mobile terminal of claim 1, wherein the number of the at least one slot is greater than or equal to two, the slots are spaced apart from each other, and the spacing between adjacent two slots is W2 and $0.3 \text{ mm} \leq W2 \leq 1 \text{ mm}$.

8. A mobile terminal comprising a housing component, wherein the housing component comprises:
a conductive housing provided with at least one slot arranged at intervals in a vertical direction thereof, wherein the at least one slot is configured to extend in a horizontal direction and divide the conductive housing into a plurality of regions, and the at least one slot is filled with an insulating layer; and
at least one conductive component intersecting with the at least one slot vertically, so as to electrically connect all regions together, wherein each of the at least one conductive component is attached to each of the all regions,
wherein, a number of the at least one conductive component and intervals at which the at least one conductive component is distributed are determined based on one or more desired operating frequencies of at least one antenna of the mobile terminal.

9. The mobile terminal of claim 8, wherein each of the at least one conductive component is welded to each of the plurality of regions.

10. The mobile terminal of claim 8, wherein the at least one conductive component is arranged at intervals along a length direction of the at least one slot.

11. The mobile terminal of claim 8, wherein the at least one conductive component has a material of aluminum alloy, and the insulating layer has a material selected from a group consisting of rubber, plastic, resin, glass, ceramic, paint, and mica.

12. The mobile terminal of claim 8, wherein a width of each of the at least one slot is W1 and $0.3 \text{ mm} \leq W1 \leq 0.5 \text{ mm}$.

13. The mobile terminal of claim 8, wherein the number of the at least one slot is N and $1 \leq N \leq 3$.

14. The mobile terminal of claim 8, wherein the interval between adjacent two slots is W2 and $0.3 \text{ mm} \leq W2 \leq 1 \text{ mm}$.

15. A manufacturing method of a housing component of a mobile terminal, comprising:

providing a substrate;

forming at least one slot on the substrate at intervals in a vertical direction of the substrate, wherein each of the at least one slot is parallel to each other to define a plurality of regions;

filling an insulating material into each of the at least one slot;

cutting off an excess portion of the substrate to form a conductive housing having the plurality of regions;

electrically connecting at least one conductive component with all regions, wherein the at least one conductive component is across the at least one slot, so as to electrically connect the plurality of regions together, and each of the at least one conductive component is attached to each of the all regions, wherein a number of the at least one conductive component and intervals at which the at least one conductive component is distributed are determined based on one or more desired operating frequencies of at least one antenna of the mobile terminal.

16. The manufacturing method of claim 15, wherein each of the at least one conductive component is welded to each of the plurality of regions.

17. The manufacturing method of claim 15, wherein the at least one conductive component is perpendicular to the at least one slot and arranged at intervals.

18. The manufacturing method of claim 15, wherein the at least one conductive component has a material of aluminum alloy and the insulating material is selected from a group consisting of rubber, plastic, resin, glass, ceramic, paint, and mica.

19. The manufacturing method of claim 15, wherein a width of each of the at least one slot is W1 and 0.3 mm≤W1≤0.5 mm.

20. The manufacturing method of claim 15, wherein the interval between adjacent two slots is W2 and 0.3 mm≤W2≤1 mm.

* * * * *